United States Patent
Patel et al.

(10) Patent No.: US 11,377,143 B2
(45) Date of Patent: Jul. 5, 2022

(54) STEERING SYSTEM WITH FAILSAFE TORQUE SENSOR COMMUNICATION

(71) Applicant: STEERING SOLUTIONS IP HOLDING CORPORATION, Saginaw, MI (US)

(72) Inventors: Keyur R. Patel, Saginaw, MI (US); Anthony J. Champagne, Saginaw, MI (US); Tejas M. Varunjikar, Rochester Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 167 days.

(21) Appl. No.: 16/784,881

(22) Filed: Feb. 7, 2020

(65) Prior Publication Data
US 2020/0172157 A1   Jun. 4, 2020

Related U.S. Application Data

(62) Division of application No. 15/717,204, filed on Sep. 27, 2017, now Pat. No. 10,604,175.
(Continued)

(51) Int. Cl.
*B62D 5/04* (2006.01)
*B62D 15/02* (2006.01)
(Continued)

(52) U.S. Cl.
CPC .......... *B62D 5/0484* (2013.01); *B62D 5/049* (2013.01); *B62D 5/0463* (2013.01); *B62D 6/00* (2013.01); *B62D 6/10* (2013.01); *B62D 15/025* (2013.01)

(58) Field of Classification Search
CPC ...... B62D 5/0484; B62D 6/10; B62D 15/025; B62D 6/00; B62D 5/049; B62D 5/0463
See application file for complete search history.

(56) References Cited

U.S. PATENT DOCUMENTS

2014/0222292 A1* 8/2014 Fisher .................. B62D 5/046
                                                         701/41

FOREIGN PATENT DOCUMENTS

DE   102009005836 A1   7/2010
DE   112014004333 T5   3/2015

OTHER PUBLICATIONS

English translation of First Office Action regarding corresponding DE Application No. DE 10 2017 122 166.2; dated Nov. 3, 2020.

* cited by examiner

*Primary Examiner* — Yuen Wong
(74) *Attorney, Agent, or Firm* — Dickinson Wright PLLC

(57) ABSTRACT

Technical solutions are described for providing failsafe assist torque in steering systems. An example method includes determining, by a first controller, a first assist torque signal using a first set of torque sensor signals from a first sensor and a second set of torque sensor signals from a second sensor, the first sensor corresponding to the first controller, and the second sensor corresponding to a second controller. The method further includes determining, by the second controller, a second assist torque signal using the first and second sets of torque sensor signals. Further the method includes generating, by a motor, an assist torque using the first and second assist torque signals, and in response to the first controller receiving a diagnostic signal indicating a failure of the first torque sensor, determining by the first controller, the first assist torque signal using only the second set of torque sensor signals.

7 Claims, 6 Drawing Sheets

Related U.S. Application Data

(60) Provisional application No. 62/400,817, filed on Sep. 28, 2016.

(51) Int. Cl.
*B62D 6/00* (2006.01)
*B62D 6/10* (2006.01)

`US 11,377,143 B2`

STEERING SYSTEM WITH FAILSAFE TORQUE SENSOR COMMUNICATION

CROSS-REFERENCES TO RELATED APPLICATIONS

This patent application is a divisional application of, and claims priority to, U.S. patent application Ser. No. 15/717,204, filed Sep. 27, 2017, which claims priority to U.S. Provisional Patent Application Ser. No. 62/400,817, filed Sep. 28, 2016, the disclosures of which are incorporated herein by reference in their entireties.

BACKGROUND

This application generally relates to communication between electronic control units (ECUs) in a vehicle, and particularly between one or more ECUs associated with an electric power steering (EPS) system in the vehicle and other ECUs in the vehicle.

Increasing reliance on automatic driving assist systems (ADAS) has resulted in one or more controllers of various subsystems in a vehicle to communicate with each other. For example, the communication facilitates the subsystems to share information, in turn facilitating a subsystem to react to actions being taken by other subsystems automatically.

In addition, increasing vehicle safety requirements are driving system redundancy to achieve higher safety levels. Redundancy is achieved by proliferation of the control system of the vehicle, to the extent of having redundant ECUs and corresponding sensors. This in turn demands a robust and failsafe communication method between the two or more ECUs and the multiple sensors. A failure of a sensor corresponding to one ECU may have an adverse effect on the overall system performance, leading to a safety hazard.

Accordingly, it is desirable to have a failsafe communication system that facilitates ECUs to determine signals based on sensor signals from multiple sensors, even those corresponding to other ECUs in the system.

SUMMARY

According to one or more embodiments, a computer implemented method for an autonomous drive assist system to provide failsafe assist torque, includes determining, by a first torque calculation module from a first controller, a first assist torque signal based on a first set of torque sensor signals from a first torque sensor and a second set of torque sensor signals from a second torque sensor, the first torque sensor corresponding to the first controller, and the second torque sensor corresponding to a second controller. The method further includes determining, by a second torque calculation module from the second controller, a second assist torque signal based on the first set of torque sensor signals from the first torque sensor the second set of torque sensor signals from the second torque sensor. The method further includes generating, by a motor, an assist torque based on the first assist torque signal and the second assist torque signal. The method further includes in response to the first torque calculation module receiving a diagnostic signal indicative of a failure of the first torque sensor, determining by the first torque calculation module, the first assist torque signal based only on the second set of torque sensor signals.

According to one or more embodiments a steering system includes a motor that generates assist torque based on one or more assist torque commands. The steering system further includes a first controller and a corresponding torque sensor. The steering system further includes a second controller and a corresponding second torque sensor. The first controller includes a first torque calculation module configured to determine a first assist torque signal based on a first set of torque sensor signals from the first torque sensor and a second set of torque sensor signals from the second torque sensor. The second controller includes a second torque calculation module configured to: determine a second assist torque signal based on the first set of torque sensor signals from the first torque sensor the second set of torque sensor signals from the second torque sensor. In response to receiving a diagnostic signal indicative of a failure of the second torque sensor, determine the second assist torque signal based only on the first set of torque sensor signals.

According to one or more embodiments a computer program product includes non-transitory computer readable medium having computer executable instructions, the computer executable instructions causing a processor executing the instructions to provide failsafe assist torque in a steering system. The steering system includes a motor that generates assist torque based on one or more assist torque commands. The steering system includes a first controller and a corresponding torque sensor. The steering system includes a second controller and a corresponding second torque sensor. Providing the failsafe assist torque includes determining, by a first torque calculation module of the first controller, a first assist torque signal based on a first set of torque sensor signals from the first torque sensor and a second set of torque sensor signals from the second torque sensor. Further, providing the failsafe assist torque includes determining, by a second torque calculation module of the second controller, a second assist torque signal based on the first set of torque sensor signals from the first torque sensor the second set of torque sensor signals from the second torque sensor. Further, providing the failsafe assist torque includes, in response to receiving, by the second controller, a diagnostic signal indicative of a failure of the second torque sensor, determining, by the second torque calculation module, the second assist torque signal based only on the first set of torque sensor signals.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
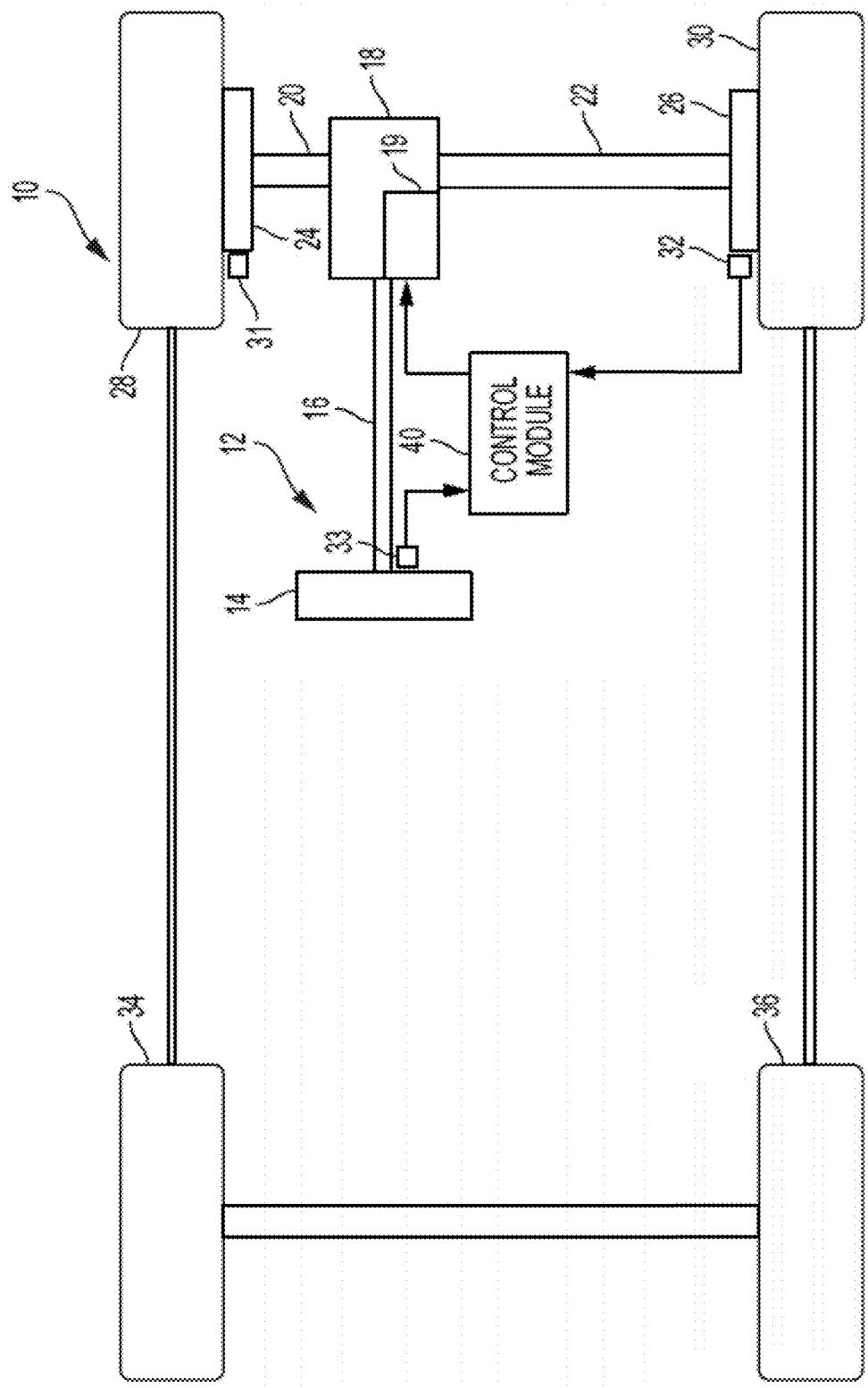
FIG. 1 illustrates a vehicle including a steering system, according to one or more embodiments.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an embodiment of a vehicle 10 including a steering system 12 such as an electrical power steering (EPS) and/or driver assistance system is illustrated. In various embodiments, the steering system 12 includes a handwheel 14 coupled to a steering shaft 16. In the embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a steering actuator motor 19 (e.g., electrical motor) and a rack and pinion steering mechanism (not shown) that may be coupled through the steering shaft 16 to the steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

The actuator motor 19 is a direct current (DC) electric machine or motor. In one embodiment, the motor 19 is a brushed DC motor. The brushed DC motor includes a stator and a rotor. The stator includes a brush housing having a plurality of circumferentially spaced brushes disposed about a commutator, each brush having a contact face that is in electrical contact with the commutator. Although embodiments described herein are applied to a permanent magnet brushed DC motor, they are not so limited and may be applied to any suitable DC machine.

As shown in FIG. 1, the vehicle 10 further includes various sensors that detect and measure observable conditions of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. The sensors 31, 32 generate wheel speed signals based thereon. In other examples, other wheel speed sensors can be provided in addition to or alternative to the sensors 31 and 32. The other wheel speed sensors may sense a rotational speed of rear wheels 34, 36 and generate sensor signals based thereon. As can be appreciated, other wheel sensors that sense wheel movement, such as wheel position sensors, may be used in place of the wheel speed sensors. In such a case, a wheel velocity and/or vehicle velocity or speed may be calculated based on the wheel sensor signal. In another example, the sensor 33 is a torque sensor that senses a torque placed on the handwheel 14. The sensor 33 generates torque signals based thereon. Other sensors include sensors for detecting the position (motor position) and rotational speed (motor velocity or motor speed) of the steering actuator motor or other motor associated with the steering assist unit 18.

A control module 40 controls the operation of the steering system 12 based on one or more of the sensor signals and further based on the steering control systems and methods of the present disclosure. The control module may be used as part of an EPS system to provide steering assist torque and/or may be used as a driver assistance system that can control steering of the vehicle (e.g., for parking assist, emergency steering control and/or autonomous or semi-autonomous steering control). In one or more examples, the control module 40 facilitates the steering system 12 to implement a steer by wire system, where the steering system 12 is not mechanically connected to one or more mechanical components of the vehicle, such as the wheels; rather, the steering system 12 receives electric control signals from one or more sensors and/or components and generates torque and maneuvering signals in response. Furthermore, in such case, the handwheel includes angle sensor (not shown) and may include additional servo motor or actuator, and corresponding sensors, such as a position sensor (not shown). The steering system 12 uses steering assist unit 18 to control the lateral movement of tie-rods 20, 26 based on the handwheel's angle signal received by the control module 40. In such case, the steering shaft 16 may be absent or may have a clutch mechanism that allows handwheel to be mechanically disengaged from rest of the steering system or vehicle. A steer by wire system may have a closed loop control for steering assist unit 19's position control and handwheel unit 14's torque control.

Aspects of embodiments described herein may be performed by any suitable control system and/or processing device, such as the motor assist unit 18 and/or the control module 40. In one embodiment, the control module 40 is or is included as part of an autonomous driving system.

A processing or control device, such as the control module 40, address technical challenges described herein by implementing the technical solutions described herein. For example, a technical challenge in a steering system 12 is that with newer vehicle technologies such as automated driver assistance systems (ADAS) and/or autonomous driving, there is an increasing demand for failsafe operational automotive subsystems such as the steering systems. For example, because in such automated driving systems and scenarios human intervention from an operator/driver is not to be relied on as much as before, the vehicle subsystems such as the steering system 12 are to implement redundant functionality to provide failsafe operation. For example, the steering system 12 is to continue operation even after a digital sensor, such as a torque sensor fails.

Figure 2:
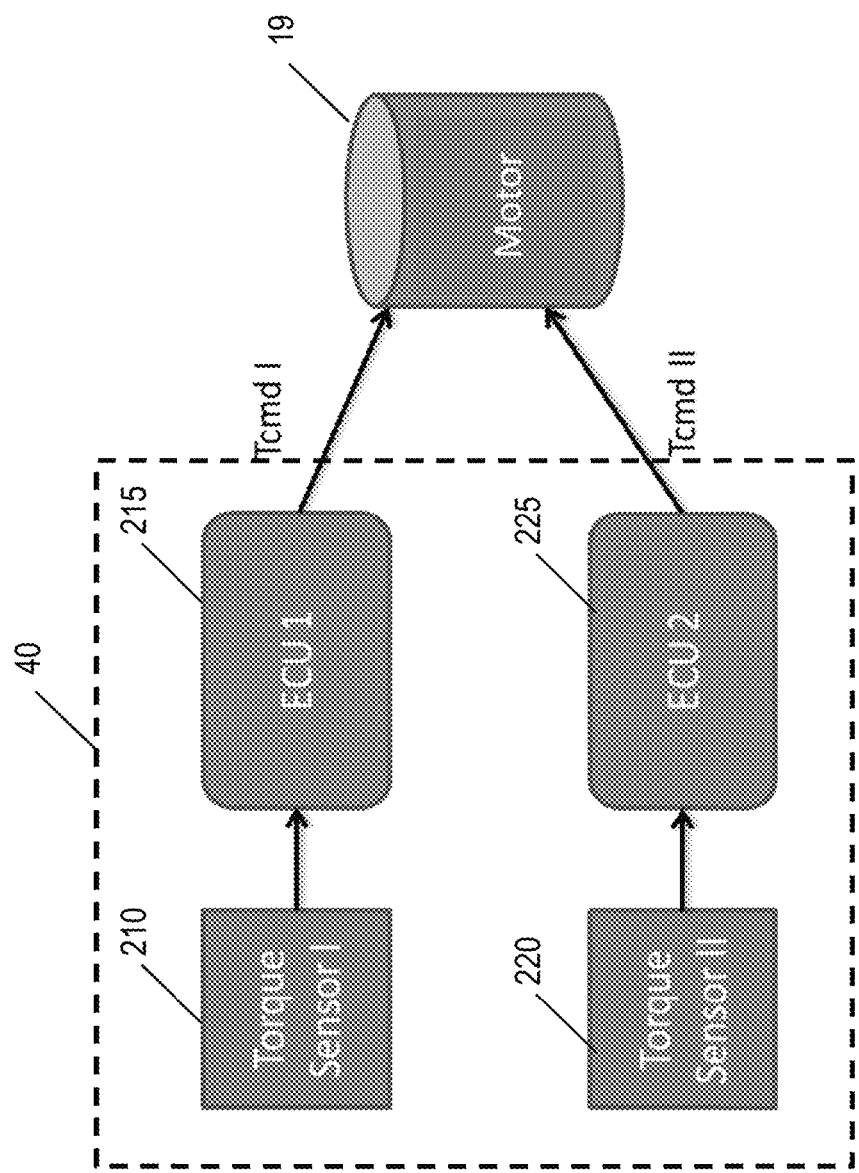
FIG. 2 depicts a block diagram of the control module providing redundant failsafe operation according to one or more embodiments.

FIG. 2 depicts a block diagram of the control module 40 providing redundant failsafe operation according to one or more embodiments. The depicted example control module 40 provides failsafe torque sensing and assist torque computations using a dual (two) electronic control unit (ECU) architecture, however, it should be noted that in other examples, additional ECUs may be used. The depicted control module 40 includes, among other components, an ECU1 215, and an ECU2 225, which respectively send/receive communication signals from a first torque sensor 210 and a second torque sensor 220. It should be noted that the examples described herein are for providing torque computations in a redundant and failsafe manner using torque sensors corresponding to each ECU in the steering system 12, however, in other examples, the technical solutions described herein can be implemented to provide failsafe and redundant computations based on other sensor signals.

Referring back to FIG. 2, in the assist torque computation example, the ECU 1 215 and the ECU2 225 provide respective torque commands to the motor 19 to generate the assist torque. The assist torque generated by the motor 19 helps the operator of the steering system 12 to maneuver the vehicle 10 using lesser force than without the assist torque. In one or more examples, the motor 19 is a dual wound motor that receives a first torque command (Tcmd-I) from the ECU1 215 and a second torque command (Tcmd-II) from the ECU2 225. The assist torque generated by the motor 19 is based on a total value of the multiple torque commands received, in this case Tcmd-I and Tcmd-II. In one or more examples, the Tcmd-I and Tcmd-II together may be referred to as an assist command provided by the control module 40 to the motor 19.

The ECU1 215 generates the Tcmd-I based on one or more torque signals received from the first torque sensor 210, and the ECU2 225 generates the Tcmd-II based on one or more torque signals received from the second torque sensor 220. Typically, when the first torque sensor 210 fails, the corresponding ECU1 215 does not generate the corresponding Tcmd-I. However, the other ECU2 225 still generates Tcmd-II. This may result in a partial assist torque based on the assist command, which in this case only includes Tcmd-II. For example, if Tcmd-I and Tcmd-II are typically substantially equal to each other, the partial assist torque may be 50% of the assist torque that may have been generated with both torque sensors being operative. Such a partial assist torque may not be desirable for all vehicle maneuvers, and poses a technical challenge. The technical solutions described herein address such a technical challenge.

Figure 3:
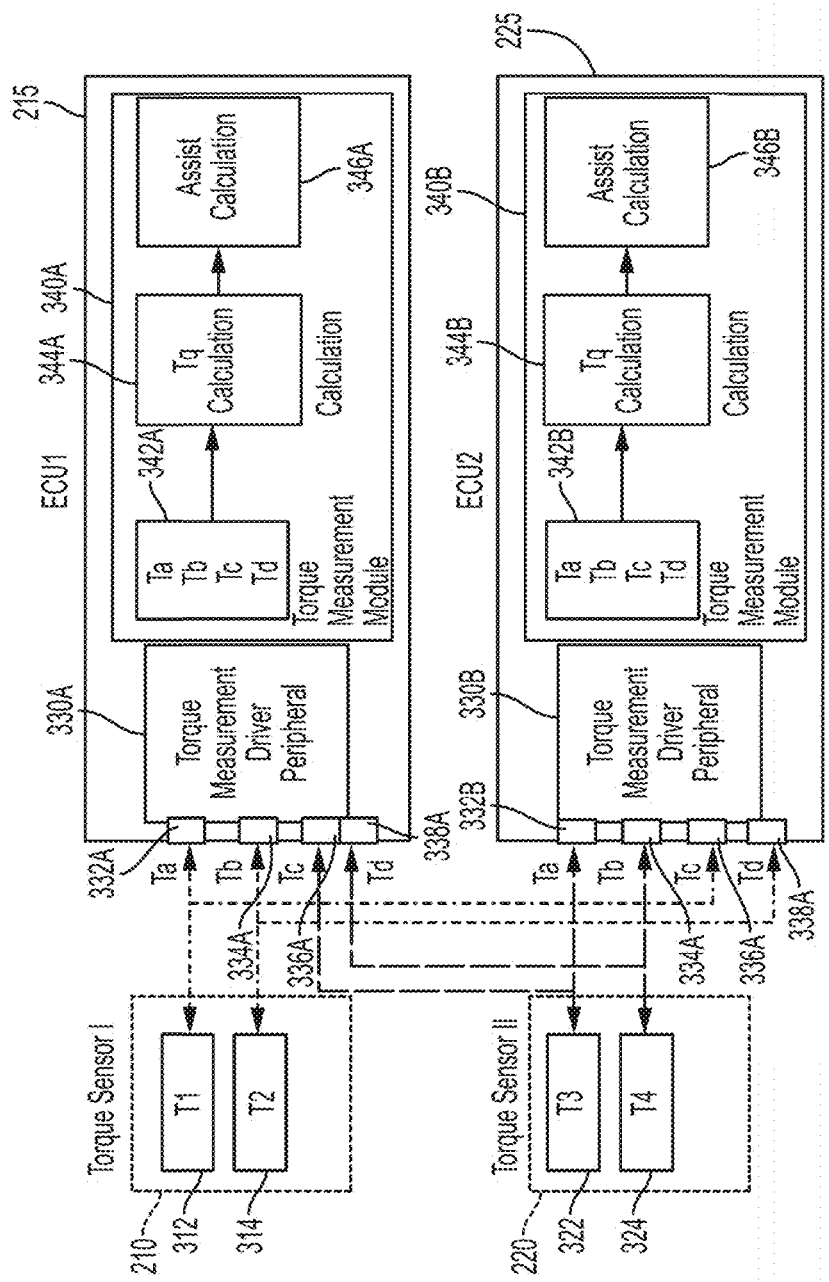
FIG. 3 depicts a block diagram of the control module to provide failsafe torque sensing and computation according to one or more embodiments.

FIG. 3 depicts a block diagram of the control module 40 to provide failsafe torque sensing and computation according to one or more embodiments. The depicted control module 40 addresses the technical challenge by sending individual torque sensor outputs to both ECU's, the ECU1 215 and the ECU2 225. With this configuration, in case of a failure of one torque sensor, say the first torque sensor 210, both ECUs continue to function and generate respective torque commands using torque signals from the operative (second) torque sensor, thus maintaining full assist. It should be noted that although the depicted example illustrates two torque signals sharing their outputs with two ECUs, in other examples the implementation may include additional torque sensors sharing respective outputs with multiple ECUs in the control module 40, where each torque sensor is corresponding to an ECU respectively.

In one or more examples, the torque sensor 210 includes two torque signal communication ports, port T1 312 and port T2 314. The torque sensor 210, in one or more examples, measures two torque values that are forwarded to the ECU' 215 via the respective ports T1 312 and T2 314. The torque sensor 210 measures the two torque values to provide further redundancy, and the ECU' 215 arbitrates between the two values received from the ports T1 312 and T2 314 to determine a torque signal value from the torque sensor 210. Similarly, the torque sensor 220 includes two torque signal communication ports T3 322 and T4 324, to send the two torque signals measured by the torque sensor 220 to the ECU2 225.

The two torque sensors 210 and 220 are controlled by the respective ECUs 215 and 225. For example, the torque sensor 210 sends measured torque signals via the ports 312 and 314 in response to receiving a trigger signal from the corresponding ECU1 215. In one or more examples, the trigger may be a pulse signal. Similarly, the torque sensor 220 sends measured torque signals via the ports 322 and 324 in response to receiving a trigger from the ECU2 225.

Further, the structures of the ECUs 215 and 225 are described. As can be seen, the two ECUs 215 and 225 include similar components. The ECU1 215 includes a torque measurement driver peripheral (TMDP) 330A, and a central processing unit (CPU) 340A. Similarly, the ECU2 225 includes a TMDP 330B and a CPU 340B.

The TMDP 330A controls sending the trigger signal and receiving the torque signals from the first torque sensor 210. For example, when a raw Tbar torque sensor measurement value is received from the first torque sensor 210, it is converted to an engineering unit inside the ECU1 215 by the TMDP 330A. In one or more examples, the TMDP 330A receives a SENT message (i.e. raw data) from the torque sensor 210 and sends it to a CPU 340A of the ECU1 215.

The TMDP 330A receives torque sensor signals from the communication ports T1 312 and T2 314 of the first torque sensor 210 via port Ta 332A and port Tb 334A respectively of the TMDP 330A. In addition, for the failsafe operation, the TMDP 330A receives torque sensor signals from the communication ports T3 322 and T4 324 of the first torque sensor 220 via port Tc 336A and port Td 338A respectively of the TMDP 330A.

Further, port Ta 232A is setup in transmit and receive mode so that the port Ta 232A can trigger and receive the raw signal (T1 312) from the first torque sensor. Further, the port Tb 234A is setup in the transmit and receive mode to trigger and receive the raw signal (T2 314) from the first torque sensor. The port Tc 236A is setup in a receive-only mode, as it can only receive the raw signal (T3 322) from the second torque sensor 220 and not trigger the second torque sensor 220 to send the signal T3 322. Similarly, the port Td 338A is setup in receive-only mode to only receive and not trigger the raw signal (T4 324) from the second torque sensor 220. The TMDP 330A forwards the signals received on the ports Ta-Td to the CPU 340A for calculation of the first torque command.

In addition, the TMDP 330A receives diagnostics signals from each communication port of the torque sensors. Each diagnostic signal is a logic signal that indicates if the corresponding value of raw torque sensor signal is valid (corresponds to a TRUE value). In case of an error/failure at the corresponding measurement, the diagnostic signal indicates that the measurement is inoperative/invalid by indicating a FALSE logic signal value. Each of ports, port T1 312, T2 314, T3 322, T4 324 forward the corresponding diagnostic signal received by the ports Ta 332A, Tb 334A, Tc 336A, and Td 338A, respectively. In one or more examples, all ports of a single torque sensor send the same diagnostic signal. For example, the ports of the first torque sensor 210, port T1 312 and port T2 314 forward a common diagnostic signal (Diag1) to the ports Ta and Tb. Similarly, the ports of the second torque sensor 220, port T3 322 and port T4 324 forward a common diagnostic signal (Diag2) to the ports Tc and Td.

In one or more examples, the CPU includes a torque measurement module 342A that converts the raw torque data from the TMDP 330A to the engineering unit (HwNm) by post processing the data. The converted torque signal values are forwarded to a torque calculation module 344A of the CPU 340A. The torque calculation module 344A computes the torque signal that is used for the first assist torque command (Tcmd I) calculation by an assist calculation module 346A. In one or more examples, the assist calculation module 346A generates the Tcmd I to compensate for the torque signal. The assist calculation module 346A may use additional control signals when generating the Tcmd I, such as motor velocity, vehicle speed, among others. The assist calculation module 346A may use an observer-based models, or the like. The assist calculation module 346A computes the assist torque command Tcmd I and forwards it to the motor 19 to generate the corresponding assist torque.

The input signals to the torque calculation module 344A includes the first set of torque sensor signals from the first sensor 210 (Ta, Tb), the second set of torque sensor signals from the second torque sensor 220 readings (Tc, Td). In addition, the TMDP forwards to the torque calculation module 344A the diagnostic signals from the two torque sensors, the Diag1 and Diag2 diagnostic signals. The torque calculation module calculates the torque signal used for assist calculation based on the torque sensor signals and the diagnostic signals. In one or more examples, the torque signal is computed based on the logic from table 1.

TABLE 1

| Diag 1 value | Diag 2 value | Output of Torque Calculation |
|---|---|---|
| TRUE | TRUE | $w \cdot Tx + (1 - w) \cdot Ty$ |
| TRUE | FALSE | Tx |
| FALSE | TRUE | Ty |
| FALSE | FALSE | Previous good | where w is a weight factor with constraint: $0 <= w <= 1$, $Tx=(Ta+Tb)/2$, and $Ty=(Tc+Td)/2$, the weight factor being a predetermined value, for example 0.5, 0.4, 0.6, and the like.

In first case, where Diag1 & Diag2 are both TRUE, weight factor, w, can assume value such as 0.5. This case is the default mode of operation of the EPS system 12 indicative of both torque sensors being operative and generating valid measurements. In this case, the torque signal is computed based on the first set of torque signals and the second set of torque signals from the respective torque sensors. It should be noted that the calculation scheme using w is one example, and that in other examples the torque calculation may be based on a different equation with different number of weighting factors.

In case the Diag1 indicates that the first torque sensor 210 is operative but the Diag2 indicates that the second torque sensor 220 is inoperative, the torque signal is computed based only on the first set of torque signals from the first torque sensor.

In case the Diag1 indicates that the first torque sensor 210 is inoperative and the Diag2 indicates that the second torque sensor 220 is still operative, the torque signal is computed based only on the second set of torque signals.

In case of failure of both torque sensors, the torque calculation uses the last known valid torque sensor signal values.

The ECU2 223 includes the same components as the ECU1 215 that operate in the same manner as described above. For example, the ECU2 225 includes a TMDP 330B with ports Ta 332B, Tb 334B, Tc 336B, and Td 338B. The ports of the TMDP 330B are connected such that Ta 332B and Tb 334B receive torque signals from the ports of the second torque sensor 220, T3 322 and T4 324 respectively. Similar to TMDP 330A, the ports Ta 332B and Tb 334B of the TMDP 330B are set in transmit and receive mode to send triggers to the second torque sensor 225. Further, the ports Tc 336B and Td 338B receive the torque signals from the ports T1 312 and T2 314 of the first torque sensor 210 in receive-only mode.

Further, the ECU2 225 includes a CPU 340B similar to the CPU 340A. The CPU 340B also includes a torque measurement module 342B that converts the torque signals received by the TMDP 330B and forwards the post processed torque signals to the torque calculation module 344B. The torque calculation module 344B calculates a second torque signal for the assist calculation module 346B to generate and forward the second torque assist command (Tcmd II) to the motor 19.

Thus, even in case of a failure the torque sensors, the ECUs continues to generate an assist torque command. Further, even in case of a failure of a single torque sensor, the corresponding ECU generates an assist torque command using torque sensor signals from a second torque sensor. Hence, a reduction in noise and measurement variation of the output of torque calculation (in each ECU) results in overall system performance improvement in terms of noise & vibration.

Thus, the torque sensor signals from all torque sensors in the system being provided to both ECUs facilitates an improvement over typical apparatus/method, for example of 50% assist in case the torque commands generated by all ECUs in the control module 40 are substantially equal.

Figure 4:
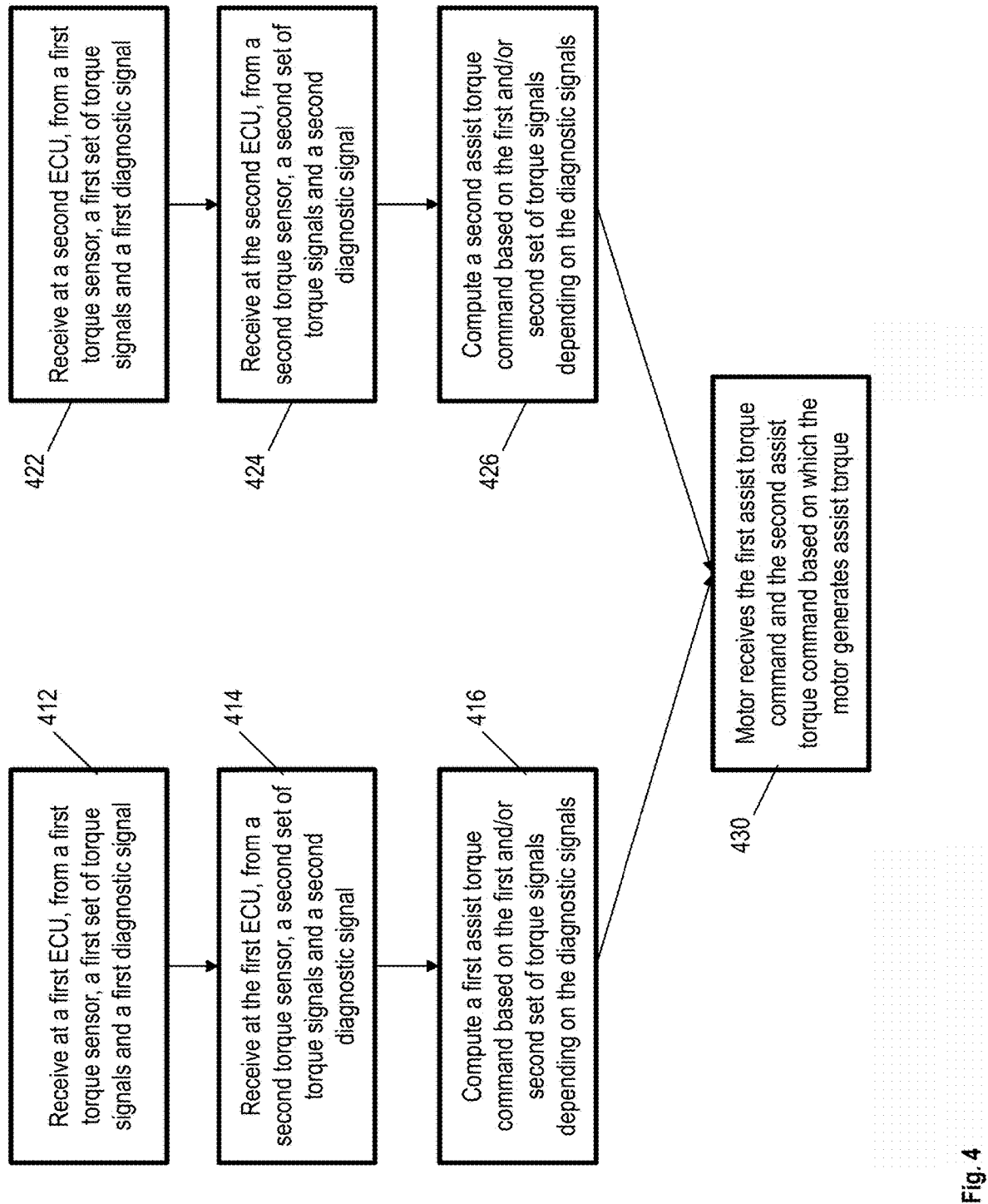
FIG. 4 illustrates a flowchart of an example method for a failsafe torque sensor signal communication and assist torque computation according to one or more embodiments.

FIG. 4 illustrates a flowchart of an example method for a failsafe torque sensor signal communication and assist torque computation according to one or more embodiments. The example method illustrated by the flowchart uses a dual ECU architecture as described earlier. However, it should be noted that in other examples, the method may be used in case of a system with more than two ECUs.

The method includes receiving at the first ECU1 215, from the first torque sensor 210, a first set of torque signals and a first diagnostic signal, as shown at block 412. The first set of torque signals are received in response to a trigger signal sent by the ECU1 215 to the first torque sensor 210. The first set of torque signals are received by ports Ta 332A and Tb 334A, which are in transmit-and-receive mode.

Further, the first ECU1 215 receives, from the second torque sensor 220, a second set of torque signals and a second diagnostic signal, as shown at block 414. The second set of torque signals are received by ports Tc 336A and Td 338A, which are in receive-only mode, and in response to the second ECU2 225 sending a trigger signal to the second torque sensor 220. In one or more examples, because the first torque sensor 210 is associated with the first ECU1 215, the torque signals received from the first torque sensor 210 are 'primary' torque signals for the ECU1 215, and the torque signals received from the second torque sensor 220 are 'secondary' torque signals for the ECU1 215.

The ECU1 215 computes the first assist torque command (Tcmd I) based on the first and/or second set of torque signals depending on the diagnostic signals as described earlier (Table 1), as shown at block 416.

Concurrently, the method includes receiving at the second ECU2 225, from the first torque sensor 210, a first set of torque signals and a first diagnostic signal, as shown at block 422. The first set of torque signals are received by ports Tc 336B and Td 338B, which are in receive-only mode, and in response to the first ECU1 215 sending a trigger signal to the first torque sensor 210.

Further, the ECU2 225 receives from the second torque sensor 220, a second set of torque signals and a second diagnostic signal, as shown at block 424. The second set of torque signals are received in response to a trigger signal sent by the ECU2 225 to the second torque sensor 220. The second set of torque signals are received by ports Ta 332B and Tb 334B, which are in transmit-and-receive mode. In one or more examples, because the second torque sensor 220 is associated with the second ECU2 225, the torque signals received from the second torque sensor 220 are 'primary' torque signals for the ECU2 225, and the torque signals received from the first torque sensor 210 are 'secondary' torque signals for the ECU2 225.

The ECU2 225 computes the second assist torque command (Tcmd II) based on the first and/or second set of torque signals depending on the diagnostic signals as described earlier (Table 1), as shown at block 426.

The method further includes receiving, by the motor 19, the first assist torque command and the second assist torque command and generating assist torque based on the two commands, as shown at block 430.

Such a configuration of the multiple ECUs and torque sensors sharing torque signals with the ECUs poses technical challenges. For example, in the case of dual ECU configuration depicted in FIG. 3, each torque command that is generated may not be substantially equal due to differences in the measured torque signals from the two torque sensors associated with each respective ECU, ECU1 215 and ECU2 225. Such differences in the two torque commands from the respective ECUs may lead to performance degradation of the steering system 12, for example, noise/vibrations caused by the variations in the torque commands. The technical solutions described herein further address such technical challenges, for example by using measurements from both the torque sensors in a manner to reduce the torque command calculation variations.

Further, another technical challenge is that a difference in the clock rate used by the two ECUs may cause missing messages from the torque sensors. For example, if the ECU1 215 operates at a first clock rate the first torque sensor 210 generates the torque signals at the first clock rate at which the ECU1 215 sends requests for the torque signal values. Further, if the ECU2 225 operates at a second clock rate, different than the first ECU1 215, the second torque sensor 220 generates the second torque signals based on the second clock rate at which the ECU2 225 sends requests for the second torque signals. In one or more examples, based on the clock rates, the ECU1 215 may miss torque signal messages generated by the second torque sensor 220, or alternatively, the ECU2 225 may miss the torque signal messages generated by the first torque sensor 210. The technical solutions described herein address such technical challenge by adjusting the clock rates of one or more components of the ECUs dynamically. In one or more examples, the clock rates may be adjusted dynamically based on diagnostic messages from the torque sensors indicating whether the torque sensors have encountered a failure/error.

For example, consider that the TMDP 330A/B requests (sends trigger) data at same period (2 ms) as the sampling time of the corresponding CPU 340A/B. However, the two CPUs 340A/B (and/or both ECUs 215 and 225) have different reference clocks. Synchronizing the reference clocks of the two CPUs 340A/B (or the ECUs 215 and 225) is typically very difficult. Further, as described above, in each ECU 215 and 225, the torque signals received at Tc 336A/B, and Td 338A/B are triggered from the other ECU. Hence, because of the different reference clocks, the secondary torque signals sent to the ECU 215/225 may not be received in time, which may cause a current iteration loop at the ECU 215/225 to be missing torque data.

Figure 5:
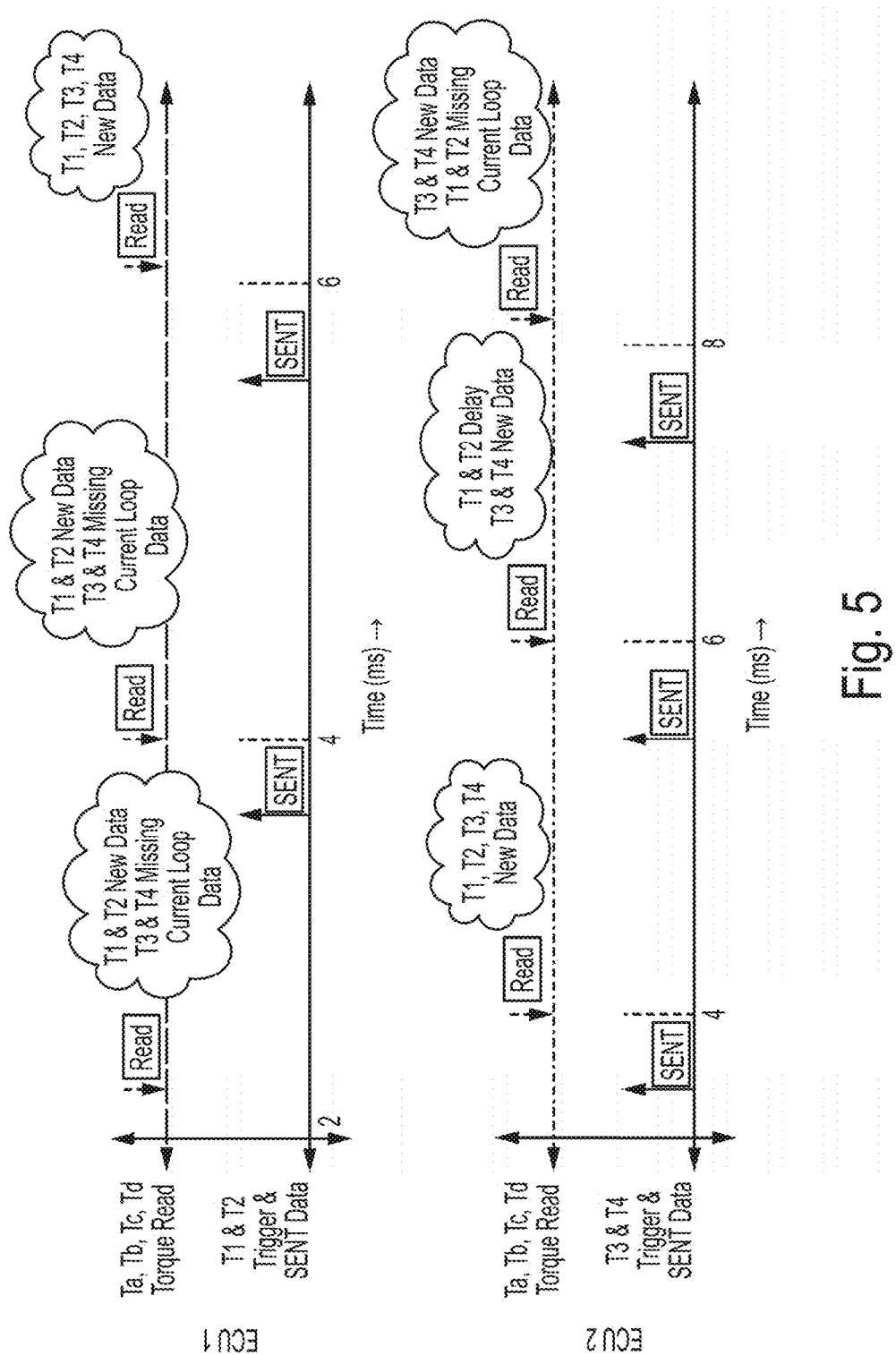
FIG. 5 depicts an example timing diagram of missing torque data according to one or more embodiments.

FIG. 5 depicts an example timing diagram of missing torque data according to one or more embodiments. In FIG. 5, the length of SENT box indicates the torque data transmission time. The example depicted illustrates an effect of the torque sensors being triggered at 2 ms on 2 ECUs, however it should be noted that in other examples, using a different triggering period has similar effect leading to missing torque data. A "Read" by an ECU is to happen only after the torque data transmission is complete; otherwise, the current loop torque data is lost as indicated.

The technical solutions described herein may address this technical challenge by a delayed reading of Tc 336A, Td 338A in ECU1 215. A delay above a predetermined duration can ensure that messages at Tc 336A, Td 338A are not missed by ECU1 215. A similar delay may be implemented at the ECU 225 for the ports Tc 336B and Td 338B. However, such delays may lead to a lag between Ta 332A/B, Tb 334A/B vs. Tc 336A/B, Td 338A/B.

Alternatively, the technical solutions described herein addresses the technical challenge by using a frequent triggering method. For example, ECU2 225 triggers T3 322, T4 324 at a rate faster (e.g. Ts/4) than the sampling time (Ts) of the CPUs 330A/B. In one or more examples, the triggering rate may be limited due to constraints imposed by a communication protocol being used. In this case, the TMDP 330A/B stores more than one (e.g. four) samples every sampling time, Ts. The number of samples stored is based on a relation between the sampling time of the CPU 330A/B and the triggering rate. Thus, even if ECU1 215 does not receive most recent sample in time, the ECU1 215 can access the previous sample as the secondary torque signals.

Figure 6:
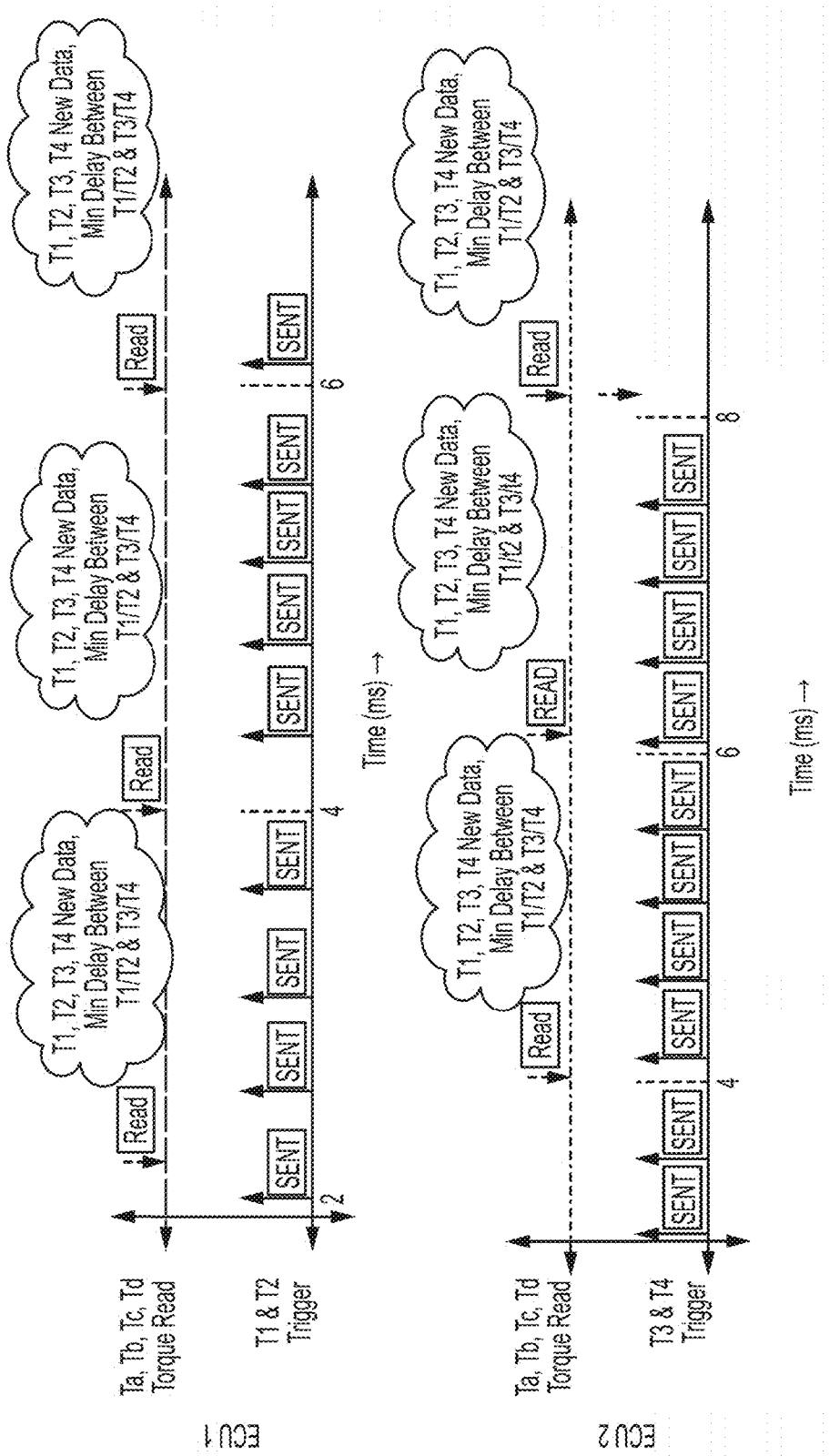
FIG. 6 depicts an example timing diagram implementing a frequent triggering according to one or more embodiments.

FIG. 6 depicts an example timing diagram implementing a frequent triggering according to one or more embodiments. In the depicted example, the sampling time of the CPUs 340A/B is 2 ms and the triggering rate of the TMDP 330A/B is accelerated to 0.5 ms. It should be noted that in other examples different sampling time and triggering rates may be used. As illustrated, because of the frequent triggering in this case the maximum delay for the ECU 215/225 in receiving secondary torque signals is reduced to 0.5 ms from 2 ms. Thus, only a partial delay is introduced at few occurrences. Hence, this solution addresses the technical challenge mentioned earlier.

Referring back to FIG. 5, it can be seen that when 2 ms triggering is used, a larger number of current loop messages were missed by a secondary torque sensor. Test results indicate that there is a sudden jump of missed messages after the system is continued in use, for example after 50 seconds and approximately 30% messages are lost during the jump within approximately 12 seconds of time span. This is because of the ECU1 vs ECU2 clock misalignment. Such current loop missed messages can be deemed unacceptable to use Tc, Td for verification/failsafe of Ta, Tb. However, as seen in FIG. 6, when using 0.5 ms triggering, in comparison, significantly fewer messages were missed in a secondary torque sensor.

Accordingly, in one or more examples, the TMDP 330A/B uses a triggering rate for requesting torque signals from the primary torque sensors (first torque sensor for the ECU1, and second torque sensor for ECU2), which is different from the sampling rate (reference clock) used by the CPU 340A/B. In one or more examples, the triggering rate is faster than the reference clock. For example, twice faster, four times faster, or any other.

Table 2 depicts example cases where the rate at which the torque signals are sampled from the torque sensors are changed, and/or the computation of the final torque is changed based on a failure at one of the torque sensors.

TABLE 2

|  | Option 1 | Option 2 | Option 3 | Option 4 |
|---|---|---|---|---|
| Handwheel Torque Measurements | Ta, Tb, Tc, Td @500 us, | Ta, Tb, Tc, Td @2 ms | Ta, Tb - @500 us Tc, Td @X ms | Ta, Tb - @500 us Tc, Td @2 ms |
| Final Torque Calculation | $w \cdot Tx + (1 - w) \cdot Ty$, where $0 < w < 1$ | $w \cdot Tx + (1 - w) \cdot Ty$, where $w = 1$, and in case of Tx Failure $w = 0$ | $w \cdot Tx + (1 - w) \cdot Ty$, where $w = 1$, and in case of Tx Failure $w = 0$ NOTE: When Tx failed, Tc, Td sample rate changed from 2 ms to 0.5 ms | $w \cdot Tx + (1 - w) \cdot Ty$, where $w = 1$, and in case of Tx Failure $w = 0$ |

The technical solutions described herein facilitate communicating individual torque sensor output to multiple ECUs, for example, in a power steering system. Hence, even after failure of one torque sensor, multiple ECUs can function while maintaining full assist torque in the steering system. The technical solutions thus provide an improvement over existing apparatus/method, for example of 50% assist. The technical solutions described herein compute output torque used for generating the assist torque command using a weighted averaging method when no diagnostics is detected for the torque sensors, the method using torque signals from multiple torque sensors. In case of a torque sensor failure, the technical solutions described herein compute the output torque using a weighted averaging method without the torque signals from the sensor encountering an error/failure.

The technical solutions, in case of a dual ECU architecture provides redundancy using two digital torque sensors (instead of four), and thus provides cost savings.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steering system comprising:
 a first controller and a corresponding torque sensor;
 a second controller and a corresponding second torque sensor, wherein:
  the first controller is configured to:
   determine a first assist torque signal based on a first set of torque sensor signals from the first torque sensor and a second set of torque sensor signals from the second torque sensor; and
   generate a first assist torque command based on the first assist torque signal;

the second controller is configured to:
determine a second assist torque signal based on the first set of torque sensor signals from the first torque sensor and the second set of torque sensor signals from the second torque sensor;
in response to receiving a diagnostic signal indicative of a failure of the second torque sensor, determine the second assist torque signal based only on the first set of torque sensor signals; and
generate a second assist torque command based on the second assist torque signal; and
a motor is configured to:
receive, from at least one of the first controller and the second controller, at least one of the first assist torque command the second assist torque command; and
generate assist torque based on the at least one of the first assist torque command and the second assist torque command,
wherein the first torque sensor sends the first set of torque sensor signals to the first controller and to the second controller in response to receiving a trigger signal from a first torque measurement driver peripheral of the first controller,
wherein the first torque measurement driver peripheral receives the second set of torque signals via communication ports configured in receive-only mode and the first set of torque signals via communication ports configured in transmit-and-receive mode,
wherein the motor is controlled by the at least one of the first controller and the second controller to assist and/or control the steering system with the corresponding generated assist torque.

2. The system of claim 1, wherein determining the first assist torque signal based on the first set of torque sensor signals and the second set of torque sensor signals further comprises:
determining the first assist torque signal as a weighted average of the first torque signal component and the second torque signal component using a predetermined weight factor.

3. A steering system comprising:
a first controller and a corresponding torque sensor;
a second controller and a corresponding second torque sensor, wherein:
the first controller is configured to:
determine a first assist torque signal based on a first set of torque sensor signals from the first torque sensor and a second set of torque sensor signals from the second torque sensor; and
generate a first assist torque command based on the first assist torque signal;
the second controller is configured to:
determine a second assist torque signal based on the first set of torque sensor signals from the first torque sensor and the second set of torque sensor signals from the second torque sensor;
in response to receiving a diagnostic signal indicative of a failure of the second torque sensor, determine the second assist torque signal based only on the first set of torque sensor signals; and
generate a second assist torque command based on the second assist torque signal; and
a motor is configured to:
receive, from at least one of the first controller and the second controller, at least one of the first assist torque command the second assist torque command; and
generate assist torque based on the at least one of the first assist torque command and the second assist torque command,
wherein the first torque sensor sends the first set of torque sensor signals to the first controller and to the second controller in response to receiving a trigger signal from a first torque measurement driver peripheral of the first controller, wherein the first torque measurement driver peripheral triggers the first torque sensor at a triggering rate that is different than a sampling rate used by the torque calculation module,
wherein the motor is controlled by the at least one of the first controller and the second controller to assist and/or control the steering system with the corresponding generated assist torque.

4. The system of claim 3, wherein the triggering rate is faster than the sampling rate.

5. A computer program product comprising a non-transitory computer readable medium having computer executable instructions, the computer executable instructions causing a processor executing the instructions to provide failsafe assist torque in a steering system, wherein:
the steering system comprises:
a first controller and a corresponding torque sensor; and
a second controller and a corresponding second torque sensor; and
wherein providing the failsafe assist torque comprises:
determining, by a first torque calculation module of the first controller, a first assist torque signal based on a first set of torque sensor signals from the first torque sensor and a second set of torque sensor signals from the second torque sensor;
generating a first assist torque command based on the first assist torque signal;
determining, by a second torque calculation module of the second controller, a second assist torque signal based on the first set of torque sensor signals from the first torque sensor the second set of torque sensor signals from the second torque sensor;
in response to receiving, by the second controller, a diagnostic signal indicative of a failure of the second torque sensor, determining, by the second torque calculation module, the second assist torque signal based only on the first set of torque sensor signals;
generating a second assist torque command based on the second assist torque signal; and
a motor configured to:
receive, from at least one of the first controller and the second controller, at least one of the first assist torque command and the second assist torque command; and
generate assist torque based on the at least one of the first assist torque command and the second assist torque command,
wherein the first torque sensor sends the first set of torque sensor signals to the first controller and to the second controller in response to receiving a trigger signal from a first torque measurement driver peripheral of the first controller,
wherein the first torque measurement driver peripheral receives the second set of torque signals via communication ports configured in receive-only mode and the first set of torque signals via communication ports configured in transmit-and-receive mode, wherein the motor is controlled by the at least one of the first controller and the second controller to assist and/or control the steering system with the corresponding generated assist torque.

6. The computer program product of claim 5, wherein determining the first assist torque signal based on the first set of torque sensor signals and the second set of torque sensor signals further comprises:

determining the first assist torque signal as a weighted average of the first torque signal component and the second torque signal component using a predetermined weight factor.

7. A computer program product comprising a non-transitory computer readable medium having computer executable instructions, the computer executable instructions causing a processor executing the instructions to provide failsafe assist torque in a steering system, wherein:

the steering system comprises:
  a first controller and a corresponding torque sensor; and
  a second controller and a corresponding second torque sensor; and
wherein providing the failsafe assist torque comprises:
  determining, by a first torque calculation module of the first controller, a first assist torque signal based on a first set of torque sensor signals from the first torque sensor and a second set of torque sensor signals from the second torque sensor;
  generating a first assist torque command based on the first assist torque signal;
  determining, by a second torque calculation module of the second controller, a second assist torque signal based on the first set of torque sensor signals from the first torque sensor the second set of torque sensor signals from the second torque sensor;
  in response to receiving, by the second controller, a diagnostic signal indicative of a failure of the second torque sensor, determining, by the second torque calculation module, the second assist torque signal based only on the first set of torque sensor signals;
  generating a second assist torque command based on the second assist torque signal; and
a motor configured to:
  receive, from at least one of the first controller and the second controller, at least one of the first assist torque command and the second assist torque command; and
  generate assist torque based on the at least one of the first assist torque command and the second assist torque command,
wherein the first torque sensor sends the first set of torque sensor signals to the first controller and to the second controller in response to receiving a trigger signal from a first torque measurement driver peripheral of the first controller,
wherein the first torque measurement driver peripheral triggers the first torque sensor at a triggering rate that is different than a sampling rate used by the torque calculation module,
wherein the motor is controlled by the at least one of the first controller and the second controller to assist and/or control the steering system with the corresponding generated assist torque.

* * * * *